United States Patent [19]

West

[11] 4,106,447
[45] Aug. 15, 1978

[54] ENGINE SPARK TIMING SYSTEM WITH RETARD MEANS AND MINIMUM BURN TIMER

[75] Inventor: Gene A. West, Kokomo, Ind.

[73] Assignee: General Motors Corporation, Detroit, Mich.

[21] Appl. No.: 789,801

[22] Filed: Apr. 22, 1977

[51] Int. Cl.$^2$ ............................................. F02P 5/04
[52] U.S. Cl. ............................ 123/117 R; 123/148 E
[58] Field of Search ........... 123/117 R, 117 D, 148 E, 123/146.5 A

[56] References Cited

U.S. PATENT DOCUMENTS

| | | | |
|---|---|---|---|
| 3,749,974 | 7/1973 | Kissel | 123/148 E |
| 3,871,347 | 3/1975 | Weber | 123/117 R |
| 3,875,912 | 4/1975 | Bullo | 123/117 R |
| 4,002,155 | 1/1977 | Harned et al. | 123/148 E |
| 4,033,272 | 7/1977 | Henrich | 123/117 R |
| 4,061,116 | 12/1977 | Saida et al. | 123/117 D |
| 4,063,538 | 12/1977 | Powell et al. | 123/117 R |

*Primary Examiner*—Charles J. Myhre
*Assistant Examiner*—Andrew M. Dolinar
*Attorney, Agent, or Firm*—Robert M. Sigler

[57] ABSTRACT

In a spark timing system for a spark ignited internal combustion engine, means are provided for generating a series of alternating coil-on and coil-off signals in accordance with crankshaft rotation and one or more engine operating conditions, means are provided for normally passing each coil-on signal immediately to the spark coil to turn on current therethrough and means are provided for passing each coil-off signal to the spark coil to turn off current therethrough with a retard determined in accordance with an additional engine operating condition to generate a spark pulse retarded with respect to the normal spark timing. To ensure a minimum burn time for the spark plugs, means are provided to hold the spark coil in the off condition for a predetermined minimum burn time following each retarded coil-off signal, regardless of the possible appearance of a coil-on signal before the end of this minimum burn time.

3 Claims, 6 Drawing Figures

ENGINE SPARK TIMING SYSTEM WITH RETARD MEANS AND MINIMUM BURN TIMER

BACKGROUND OF THE INVENTION

This invention relates to spark timing systems for spark ignition, internal combustion engines and particularly to such spark timing systems including a crankshaft driven source of alternating current ignition signals and means to switch current on and off in a spark coil in response to such signals to generate spark pulses for application to the spark plugs at normal predetermined times with respect to crankshaft rotation.

It may be desirable to selectively retard the spark pulses from the normal predetermined spark timing under certain conditions. As example is found in the advancement of normal predetermined spark timing for greater power and fuel economy or addition of an engine turbocharger and the corresponding addition of a system effective to automatically retard the spark timing upon the sensing of engine knock or certain engine operating conditions conducive to engine knock. For example, a system capable of measuring engine knock intensity, developing an output signal in response thereto, and applying the signal to retard engine spark timing is shown and described in the U.S. Pat. No. 4,002,155, to Harned et al issued Jan. 11, 1977.

However, retard in any spark pulse follows the normal coil-on signal from the alternating current signal generator. Therefore, when engine speed is high and the retard is lengthy, the next coil-on signal from the alternating current signal generator may follow the retarded spark pulse very closely and, in extreme conditions, may even precede the retarded spark pulse. As a result, the spark burn time or conduction time of the spark plug, which requires the conduction in the spark coil primary to be cut off, may be too short to ensure complete combustion in the cylinder.

SUMMARY OF THE INVENTION

Therefore, an engine spark timing system and method are proposed which, when added to the conventional spark timing system and method, are effective to retard the engine spark timing from the normal engine spark timing by an additional amount determined from one or more engine operating variables but, at the same time, are effective to ensure a minimum coil-off time or spark burn time to avoid engine misfire at high engine RPM and additional retard.

In accordance with this invention, apparatus is inserted in the conventional spark timing system between the alternating current signal generator and the switch means which controls current through the coil. This apparatus includes means to normally pass on the coil turn-on signal to the switch means, means to pass on the coil turn-off signal to the switch means with a retard to produce a retarded spark pulse, means to generate a minimum burn pulse of predetermined constant time duration coincident with each retarded spark pulse and means to prevent the passing on of the following coil turn-on signal to the switch means while the minimum burn pulse is present.

This invention is intended to contribute to good combustion in internal combustion automotive engine with the expected advantageous results of low engine emissions and smooth engine operation. The invention is further intended to enable automotive engine designers to retune present engines for improved power and fuel efficiency or add engine turbo-charging means for greater power so that a smaller and therefore more fuel efficient engine can be substituted for a present engine with equivalent performance in a vehicle.

Further details and advantages of this invention will be apparent from the accompanying drawings and following description of a preferred embodiment.

DESCRIPTION OF THE PREFERRED EMBODIMENT

Figures 1, 2:
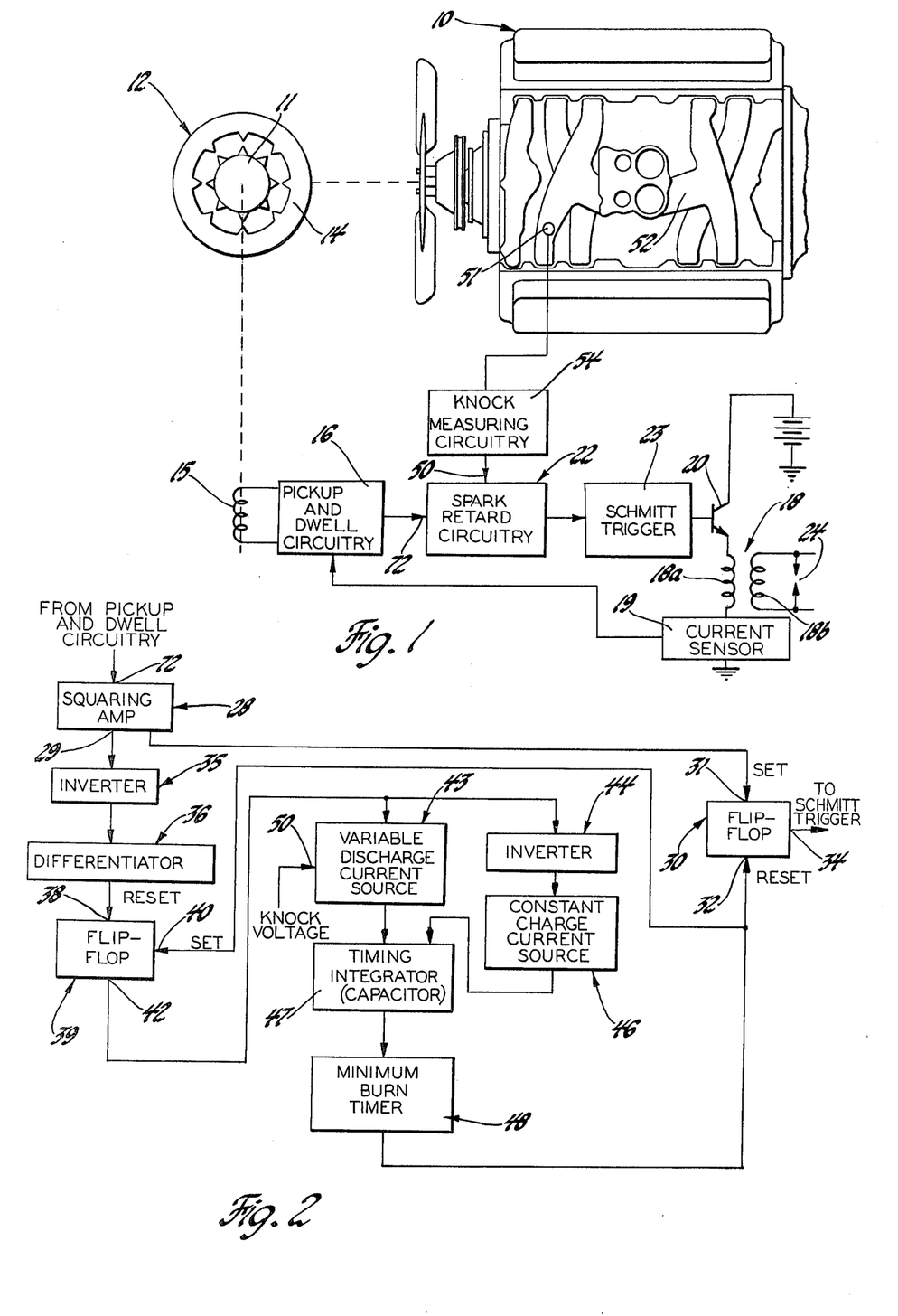
FIG. 1 shows an internal combustion engine and spark timing system including this invention.
FIG. 2 shows a block diagram of a portion of the spark timing system of FIG. 1.

Referring to FIG. 1, an internal combustion engine 10 has a rotating crankshaft which drives the rotor 11 of an alternating current signal generator 12. Generator 12 is a standard spark timing signal generator of the variable reluctance type disclosed and described in U.S. Pat. No. 3,254,247 to Falgy, which issued May 31, 1966. Generator 12 also includes a stator 14 and pickup coil 15 and provides a plurality of equally spaced projections around rotor 11 and stator 14 related to the number of cylinders in engine 10. Relative rotation between the rotor 11 and stator 14 at a speed proportional to engine speed produces a pulsating variation in reluctance which induces an alternating voltage signal in coil 15 similar to those shown in FIG. 4.

Figure 4:
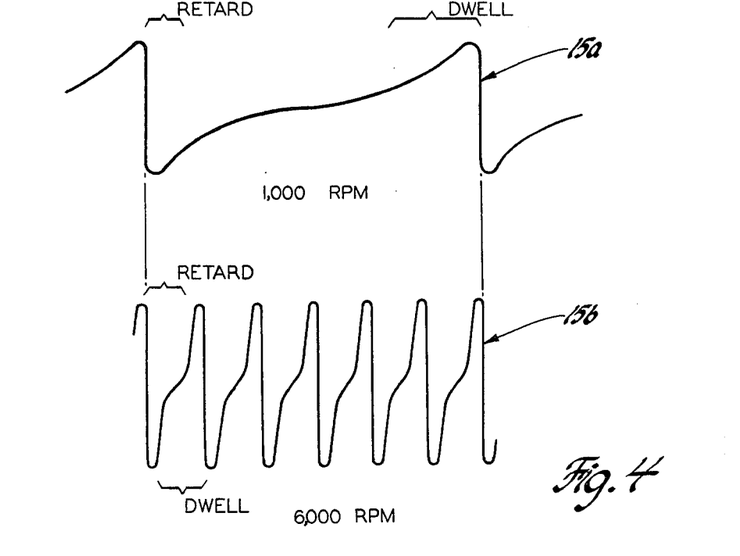
FIG. 4 shows the output, at different engine speeds, of crankshaft driven alternating voltage generating means used in the spark timing system of FIG. 1.

The alternating voltage signal in coil 15 is applied to pickup and dwell circuitry 16 which generates at its output an alternating voltage signal similar to those shown in FIG. 4 but shifted upward and downward with reference to a fixed reference voltage. In this case, each upward crossing of the reference voltage by the alternating voltage signal would be a coil-on signal and each downward crossing of the reference voltage by the alternating voltage signal would be a coil-off signal. A current sensor 19 can be provided to sense the current through spark coil primary 18a and provide a feedback signal thereof to pickup and dwell circuitry 16 wherein the alternating voltage signal can be shifted with respect to the reference voltage to control the dwell time between the coil-on and coil-off signals and therefore the maximum current and energy buildup in the coil.

The output of pickup and dwell circuitry 16 is provided to spark retard circuitry 22, to be described below. The output of circuitry 22 is provided to a Schmitt trigger 23, the switching voltage of which is the aforementioned reference voltage. Schmitt trigger 23 thus switches transistor 20 on and off to control current through spark coil primary 18a in accordance with the alternating voltage signal as shifted in pickup and dwell circuitry 16 and modified in spark retard circuitry 22. When current flows through spark coil primary 18a, electromagnetic energy builds up in the spark coil 18; and when current is cut off by transistor 20 this energy is released in a high voltage spark pulse induced in spark coil secondary 18b, which spark pulse is provided to an appropriate spark plug 24 through the standard distributor, not shown. The dwell time, or time in which current is allowed by transistor 20 to flow through spark coil primary 18a, is continually adjusted by the aforementioned feedback signal so that current flows for a time sufficient to build up the required electromagnetic energy in spark coil 18 but no longer than this sufficient time, to prevent unnecessary and possibly harmful power dissipation in transistor 20. Those skilled in the art will recognize that pickup and dwell circuitry 16 and Schmitt trigger 23 are well known in the art, a published example being the U.S. Pat. No. 3,838,672 to Richards et al, issued Oct. 1, 1974. Spark retard circuitry 22 is inserted at the top of the pickup coil, between point 9a and resistor 37, FIG. 1, in the aforementioned Richards et al patent.

Spark retard circuitry 22 is shown in block diagram form in FIG. 2. A squaring amplifier 28 receives the output of the pickup and dwell circuitry 16, compares it to the same reference as Schmitt trigger 23 and squares the wave form into a square wave in which up pulses represent coil-on signals and down pulses represent coil-off signals. A flip-flop 30 has a set input 31 connected to the output 29 of squaring amp 28, a reset input 32 and an output 34. Flip-flop 30 is a bistable circuit which normally assumes a first state having a high output on output 34 when a high input is received on set input 31 and a second stable state with a low output on output 34 when a high input is received on reset input 32. Flip-flop 30 is constructed in such a way that reset input 32 dominates set input 31: that is, if high inputs are received simultaneously on the set and reset inputs, the second state is assumed and a low output is produced on output 34.

The output 29 of squaring amp 28 is also connected through an inverter 35 and differentiator 36 to the reset input 38 of a flip-flop 39. Flip-flop 39 has a set input 40 and further has an output 42 connected to control a variable discharge current source 43 and, through an inverter 44, a constant charge current source 46.

Variable discharge current source 43 and constant charge current source 46 are connected to alternately control current flow to a timing integrator 47, which is in turn connected through a minimum burn timer 48 to reset input 32 of flip-flop 30 and set input 40 of flip-flop 39.

Figure 3:
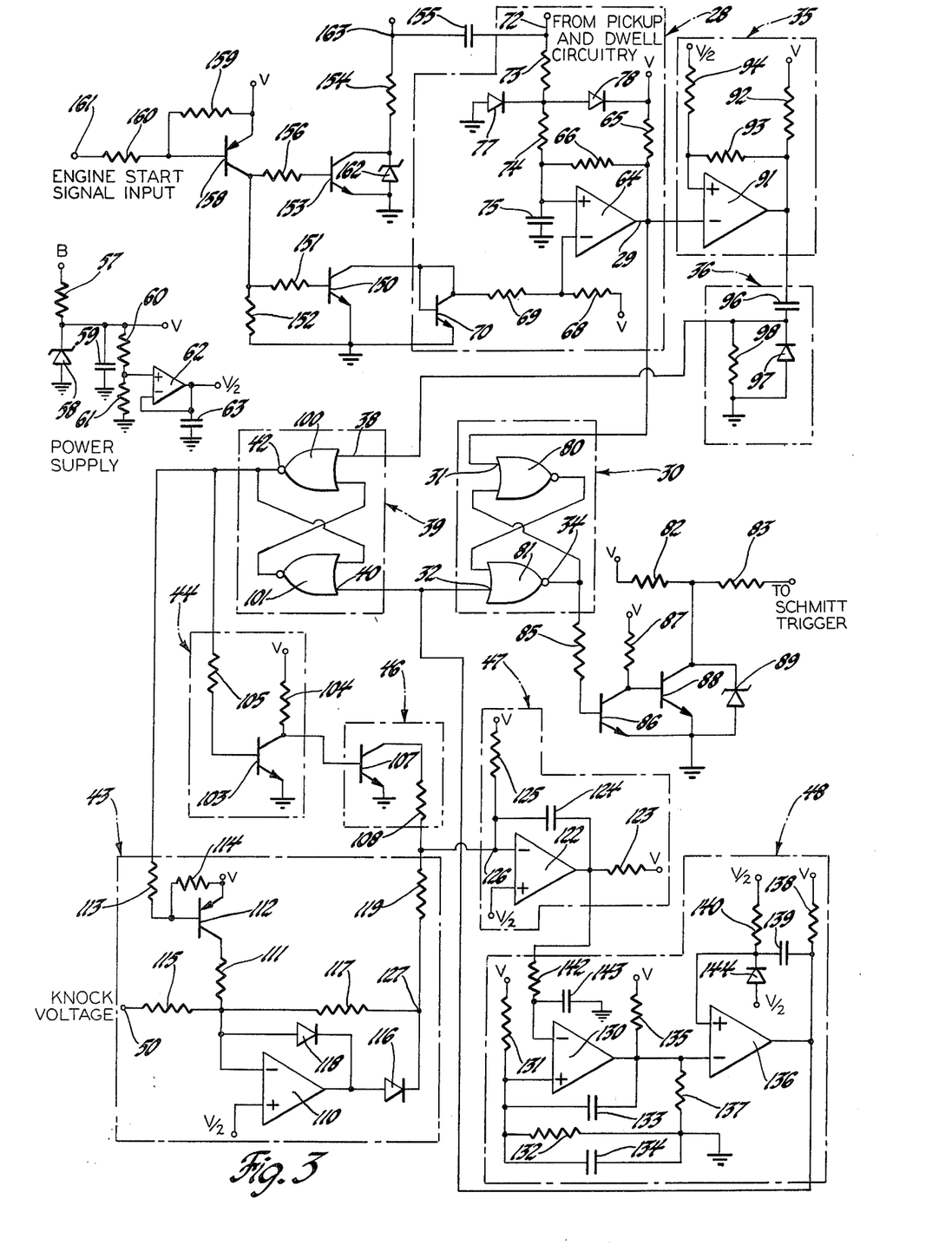
FIG. 3 shows a circuit diagram of the system shown in FIG. 2.

The operation of the system of FIGS. 1 and 2 will be briefly described with reference to the wave forms of FIG. 5, before the more detailed circuit of FIG. 3 is described. As the crankshaft of engine 10 rotates, the pickup and dwell circuitry 16 has an output shaped similarly to wave form 15a of FIG. 4. This output is shifted up or down with respect to a constant reference voltage by the feedback loop including current sensor 19 and is shifted in phase with respect to a constant reference crankshaft angle of rotation by standard centrifugal and vacuum advance means, not shown, to produce a normal spark timing. The reference voltage with respect to which wave form 15a is shifted up or down would ordinarily be, in the absence of spark retard circuitry 22, the switching voltage of Schmitt trigger 23. This switching voltage is duplicated in the switching voltage of squaring amp 28 in the spark retard circuitry 22, squaring amp 28 thus simulating Schmitt trigger 23 from the point of view of pickup and dwell circuitry 16.

Figure 5:
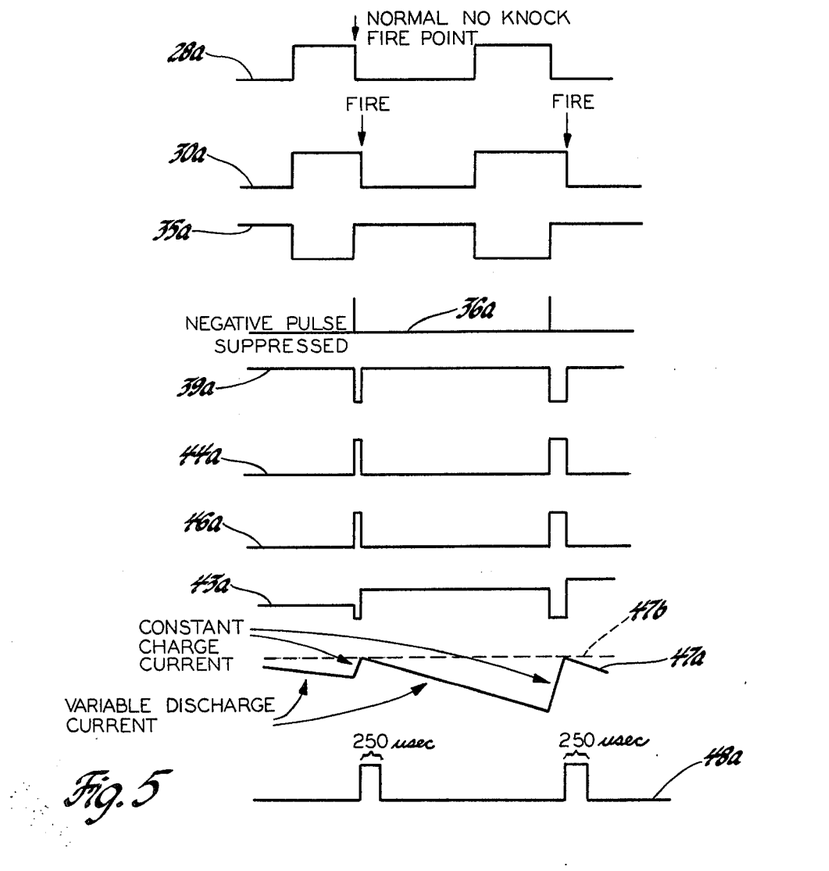
FIG. 5 shows a plurality of wave forms representing the outputs of various elements in the system of FIG. 2.

The output of squaring amp 28, seen as wave form 28a in FIG. 5, comprises a square wave having alternate up pulses corresponding to the normal coil-on signals and down pulses corresponding to the normal coil-off signals. When the output 29 of squaring amp 28 goes high, on each up pulse, the set input to flip-flop 30 normally causes the output 34 of flip-flop 30 to go high at the same time, as seen in wave form 30a of FIG. 5. The output of inverter 35 as seen in wave form 35a of FIG. 5, is caused to pulse downward in response to the up pulse from squaring amp 28; however, any negative spike or pulse which would be generated in differentiator 36 is suppressed and has no effect on flip-flop 39, as seen in wave form 39a of FIG. 5. Assuming that the output of flip-flop 39 is high at this point, variable discharge current source 43 has been allowing timing integrator 47 to ramp downward, as seen in wave form 47a of FIG. 5 and as to be further described below.

The effect of a normal coil-off signal or down pulse can be seen in the various wave forms of FIG. 5. It has no direct effect on flip-flop 30 through set input 31; but, through inverter 35 and differentiator 36, it provides a positive spike or pulse, as seen in wave form 36a, to reset input 38 of flip-flop 39. The output of flip-flop 39 at this moment pulses downward to turn off the variable discharge current source 43 and, through inverter 44, to turn on constant charge current source 46, as seen in wave forms 43a, 44a and 46a. Timing integrator 47 begins integrating upward at a constant rate, as seen in wave form 47a, until it reaches a reference voltage indicated as level 47b in FIG. 5. At this point it causes minimum burn timer 48 to produce a positive pulse of predetermined width, in this embodiment 250 microseconds, exaggerated in width in wave form 48a of FIG. 5. The leading or upward edge of this positive pulse causes flip-flop 30 to switch to its second stable state and thus provide a coil-off signal to Schmitt trigger 23 and transistor 20 to shut off current in spark coil primary 18a and create a spark pulse to fire a spark plug. It also causes flip-flop 39 to switch to its first stable state, which turns off constant charge current source 46, turns on variable discharge current source 43 and starts timing integrator 47 ramping downward once again.

The retard time between the down pulse in wave form 28a and the resulting down pulse in wave form 30a is the amount of retard provided by spark retard circuitry 22 and is directly a result of the time required by timing integrator 47 to integrate upward to reference level 47b at a constant integration rate. This is, in turn, determined by both the amount of time spent by the timing integrator in integrating downward from reference level 47b and the particular rate of downward integration. The use of downward and upward integration removes vehicle or engine speed as a factor and makes the amount of retard a function in degrees of crankshaft rotation of the downward integration rate or, in other words, of the discharge current.

The variable discharge current source 43 has an input 50 which receives a signal in the form of a DC voltage level from vehicle operating condition monitoring means comprising, in this embodiment, an engine knock sensor 51 mounted on the intake manifold 52 of engine 10 and knock measuring circuitry 54 which converts the signals from sensor 51 indicative of engine knock into a usable DC level varying in response to the intensity of said signals. However, the DC input to input 50 could be derived from engine operating conditions other than knock itself.

Thus the systems of FIGS. 1 and 2 will produce a retard with respect to the normal spark timing produced by crankshaft position, vacuum and centrifugal advance, which retard is determined by the output of knock measuring circuitry 54 applied to input 50 of variable discharge current source 43. The dwell determining circuitry comprising current sensor 19 and pickup and dwell circuitry 16 will respond automatically to correct the dwell or coil-on time whenever changes in the measured knock or other engine operating condition cause a change in the additional retard. In addition, the 250 misrosecond pulse produced by minimum burn timer 48 also plays a role in the system operation, as will be apparent from an examination of wave forms 15a and 15b of FIG. 4.

Referring to wave form 15a of FIG. 4, the normal spark firing times occur on the sharply downward breaking sections of the curve. At 1,000 RPM in a V-8 engine, these times are spaced by approximately 15 milliseconds or 90° of crankshaft revolution. Since the maximum retard from these normal spark firing times would probably be about 15° to 20° of crankshaft revolution, the next coil-on signal, which would occur at the beginning of the dwell shown in wave form 15a, will occur well after the spark firing. However, at 6,000 RPM, the spark firings are only 2.5 milliseconds apart; and, as indicated on wave form 15b of FIG. 4, the dwell period takes up most of that time between spark firings. Even though the maximum retard is much shorter when shown in the time domain, there is no longer a great separation, either in terms of time or crankshaft angle, between a retarded spark pulse and the coil-on signal which starts the dwell period; and, in fact, there may be an overlap.

However, even at high engine speeds, good combustion requires a certain minimum burn time for the spark. If the spark plug conduction or burn time is cut short by the occurrence of a coil-on signal and resulting resumption of current in the spark coil primary too soon after the retarded coil-off signal which turned off current in the coil primary and started the spark pulse in the coil secondary, combustion in the cylinder may not be complete; and a number of undesirable effects, such as lower power, higher undesirable exhaust emissions, or rough operation, may occur.

Thus, the minimum burn timer 48 comprises a one-shot multivibrator which, when triggered by timing integrator 47, puts out a high pulse lasting a certain predetermined time to reset flip-flop 30 to its second or coil-off state and hold it in that state for that predetermined time. If a set input is received by flip-flop 30 from squaring amp 28 before the end of that predetermined time, it is overridden by reset input 32 until the end of the minimum burn pulse; and only at the end of the minimum burn pulse can it cause the output of flip-flop 30 to switch high. Thus, a minimum coil-off time and a resulting minimum spark burn time are ensured by minimum burn timer 48.

FIG. 3 shows a circuit embodiment of the system shown in block diagram form in FIG. 2. The elements in FIG. 3 are grouped and shown in blocks which correspond to the blocks shown in FIG. 2. The circuit of FIG. 3 is powered by a regulated DC power supply comprising a resistor 57 and zener diode 58 connected between the normal vehicle battery or generator, indicated as B, and ground. The supply further comprises a capacitor 59 connected in parallel with zener diode 58 to ground and a series pair of resistors 60 and 61, equal in resistance and connected in parallel with capacitor 59. A regulated voltage V is obtained from the junction of zener diode 58 and capacitor 59. An operational amplifier or op-amp 62 has its positive input connected to the junction of resistors 60 and 61 and its output fed back to its negative input and connected through a capacitor 63 to ground. A voltage V/2, equal to ½ voltage V, is obtained from the output of op-amp 62.

Squaring amp 28 comprises an operational amplifier or op-amp 64, the output of which is connected to power source V through a resistor 65 and fed back through a resistor 66 to its positive input. Resistors 65 and 66 cause op-amp 64 to act as a comparator, comparing its positive input to its negative input and switching its output high or low, depending on which input is greater.

The negative input of op-amp 64 is connected to the junction of a series pair of resistors 68 and 69, with the other end of resistor 68 connected to power source V and the other end of resistor 69 connected to the collector of a transistor 70. Transistor 70 has its emitter grounded and its base connected to the collector, so that it presents the characteristics of a switch with a diode voltage drop when on. Transistor 70 is biased on during normal operation of the circuit and the negative input of op-amp 64 is thus provided a reference voltage which is designed to approximate the switching characteristic of the Schmitt trigger circuit 23. The input 72 to squaring amp 28, which receives the output of pickup and dwell circuitry 16, is connected through a pair of series resistors 73 and 74 to the positive input of op-amp 64. A capacitor 75 is connected between the positive input of op-amp 64 and ground. Ground is connected through a diode 77 to the junction of resistors 73 and 74, which is, in turn, connected through a diode 78 to power source V. Diodes 77 and 78 protect op-amp 64 from voltages greater than V or less than ground.

The output of pickup and dwell circuitry 16 is thus supplied through resistors 73 and 74 to the positive input of op-amp 64, in which it is compared with the reference voltage at the junction of resistors 68 and 69. The values of resistors 68 and 69 and the characteristics of transistor 70 are picked to duplicate the switching characteristics of Schmitt trigger circuit 23 as shown in the previously described Richards et al reference. Resistors 68 and 69 set the basic voltage switching level; and transistor 70, which presents a diode voltage drop when conducting, provides the proper temperature variation.

Flip-flop 30 comprises a pair of NOR gates 80 and 81, one of the inputs of NOR gate 80 comprising set input 31 and one of the inputs of NOR gate 81 comprising reset input 32. The output of NOR gate 81 comprises output 34 and is connected to the other input of NOR gate 80; and the output of NOR gate 80 is connected to the other input of NOR gate 81. This is a standard flip-flop or bistable circuit having a first stable state with a high output at output 34 actuated by a high input on input 31 and a second stable state with a low output on output 34 actuated by a high input on input 32. It will also be seen that input 32 is dominant and produces a low output on output 34, as long as it is present, regardless of the input on input 31.

Output 29 of op-amp 64 is connected to input 31 of NOR gate 80; and output 34 of NOR gate 81 is connected through a resistor 85 to the base of an NPN transistor 86 having a grounded emitter and a collector connected through a resistor 87 to potential source V. The collector of transistor 86 is also connected to the base of an NPN transistor 88 having a grounded emitter and a collector connected through a resistor 82 to power source V and a resistor 83 to Schmitt trigger 23. A zener diode 89 is connected from emitter to collector of transistor 88. Transistors 86 and 88 are switched by the output 34 of flip-flop 30 and provide coupling between output 34 and Schmitt trigger circuit 23. Zener diode 89 provides arc-over protection for this circuit against possible high voltage spikes from the rest of the ignition system.

Output 29 of op-amp 64 is also connected to the negative input of an op-amp 91 having an output connected to voltage source V through a resistor 92 and fed back to the positive input through a resistor 93, the positive input being connected to voltage source V/2 through a resistor 94. Op-amp 91 is thus connected as a comparator which inverts the output of op-amp 64 and comprises inverter 35.

The output of op-amp 91 is connected through a capacitor 96 and resistor 98 to ground. A diode 97 is connected from ground in parallel with resistor 98. These elements comprise differentiator 36, since the switching of the output of op-amp 91 from the low to a high state causes a high, sharp voltage pulse to be generated at the junction of capacitor 96 and diode 97. Diode 97 prevents the voltage at that junction from dropping below ground when the output of op-amp 91 switches in the opposite direction and thereby suppresses negative pulses.

Flip-flop 39 comprises a pair of NOR gates 100 and 101, NOR gate 100 having an input comprising the reset input 38 of flip-flop 39 and NOR gate 101 having an input comprising the set input 40 of flip-flop 39. The output of each of NOR gates 100 and 101 is connected to the other input of the other of NOR gates 100 and 101; and the output of NOR gate 100 further comprises the output 42 of flip-flop 39. Input 38 is connected to the junction of capacitor 96 and diode 97 in differentiator 36.

Inverter 44 comprises an NPN transistor 103 having a grounded emitter, a collector connected to power source V through a resistor 104 and a base connected to output 42 of flip-flop 39 through a resistor 105. Constant current source 46 comprises an NPN transistor 107 having a grounded emitter, a base connected to the collector of transistor 103 and a collector connected to one end of a resistor 108. Inverter 44 acts as a switch to control the output of constant current source 46. When the output 42 of flip-flop 39 is high, transistor 103 turns on and causes transistor 107 to turn off. When output 42 of flip-flop 39 is low, transistor 103 turns off to turn on transistor 107 and provide current through resistor 108, which will be seen at a later point in this description to be a predetermined constant current.

Variable discharge current source 43 comprises an op-amp 110 having a positive input connected to power source V/2 and a negative input connected through a resistor 111 to the collector of a PNP transistor 112. Transistor 112 has an emitter connected to power source V and a base connected both through a resistor 113 to output 42 of flip-flop 39 and through a resistor 114 to the emitter. Input 50 of variable discharge current source 43, which is connected to knock measuring circuitry 54, is connected through a resistor 115 to the negative input of op-amp 110. The output of op-amp 110 is connected through a diode 116 and resistor 117 in series to the negative input of op-amp 110, which is connected through a diode 118, in parallel with diode 116 but oppositely biased, back to the output of op-amp 110. The junction of resistor 117 and diode 116 is connected through a resistor 119 to the other end of resistor 108 of constant current source 46.

Timing integrator 47 comprises an op-amp 122 having a positive input connected to power source V/2 and a negative input connected to the junction of resistors 108 and 119. The output of op-amp 122 is connected through a resistor 123 to power source V and fed back through a capacitor 124 to the negative input. The negative input of op-amp 122 is also connected to power source V through a resistor 125. Op-amp 122 is thus connected as an integrator; and its output voltage will ramp upward or downward, the direction and ramping rate dependent upon the currents supplied to the junction 126 at the input of op-amp 122 from capacitor 124, resistor 125, resistor 108 and resistor 119.

In the operation of timing integrator 47, variable discharge current source 43, inverter 44 and constant charge current source 46, it has already been noted that when output 42 of flip-flop 39 is low, transistor 107 of constant charge current source 46 is on, thus connecting junction 126 to ground through resistor 108. At the same time, transistor 112 of variable discharge current source 43 is on, thus clamping the voltage at junction 127 of resistor 117 and diode 116 to V/2. Since the voltage junction 126, in the analysis of an ideal op-amp, must be V/2, there is thus no current flowing through resistor 119. Resistor 125 is comparatively large so that only a small current flows from potential source V through resistor 125 to junction 126. This small current is added to current flowing from potential source V through resistor 123 and capacitor 124; and the combined current flows through resistor 108 and transistor 107 to ground, thus causing the output voltage of op-amp 122 to rise.

When the output 42 of flip-flop 39 is high, however, transistor 107 of constant charge current source 46 is turned off to prevent current flowing from junction 126 to ground through resistor 108. In addition, transistor 112 of variable discharge current source 43 is turned off to allow the voltage at junction 127 to be controlled by the input voltage on input 50 from the knock measuring circuitry 54. If the voltage at input 50 is equal to or greater than V/2, the voltage at junction 127 will be clamped to V/2; and current will flow only from potential source V through resistor 125 and capacitor 124 to cause the output voltage of op-amp 122 to fall very slowly. However, as the input voltage on input 50 is decreased from V/2 towards 0, the voltage at junction 127 increases and thus causes a current to flow from junction 127 through resistor 119 to junction 126, which current increases correspondingly with the decrease in the voltage at input 50 from V/2. This current is added to the current through resistor 125 flowing through capacitor 124 to control the downward ramping rate of the output voltage of op-amp 122. Knock measuring circuitry 54 is designed so that it generates an output voltage equal to V/2 when no additional retard is desired and further generates an output voltage, when additional retard is required, which is lower than V/2 by an amount proportional to the amount of retard required, the voltage corresponding to maximum retard still being above ground.

The output of op-amp 122 is connected through a resistor 142 to the negative input of an op-amp 130, which is also connected to ground through a capacitor 143. Resistor 142 and capacitor 143 form a low-pass filter on the negative input of op-amp 130 to filter out high frequency noise which might cause false triggering of the minimum burn timer 48 and shortening of the minimum burn time. A pair of series resistors 131 and 132 are connected between power source V and ground. The junction of resistors 131 and 132 is connected to the positive input of op-amp 130 to supply a constant reference voltage thereto. A capacitor 133 is connected between the output and positive input of op-amp 130; and another capacitor 134 is connected in parallel with resistor 132.

Another op-amp 136 has its negative input connected to the output of op-amp 130, through a resistor 135 to power source V and through a resistor 137 to ground. The output of op-amp 136 is connected through a resistor 138 to power source V and through a capacitor 139 to the positive input of op-amp 136. A resistor 140 and a diode 144 are connected in parallel from power source V/2 to the positive input of op-amp 136. Resistors 135 and 137 are chosen to normally provide a higher voltage to the negative input of op-amp 136 than the voltage V/2 normally supplied to the positive input, so that op-amp 136 normally has a low output. These elements comprise the minimum burn timer 48.

In the operation of the circuit of FIG. 3, a coil-on signal comprising a rise in the voltage on input 72 above a particular reference voltage causes the output of op-amp 64 to switch high. This normally causes the output 34 of flip-flop 30 to switch high, which switches the collector of transistor 86 low and the collector of transistor 88 high, so that a high signal is applied to Schmitt trigger circuit 23 and current begins to flow through spark coil primary 18a.

The output of flip-flop 39 is normally high at this time; and the switching of op-amp 91 to a low output state has no effect on it. Transistor 107 is off, as previously described, and the output voltage of op-amp 122 is ramping downward.

When the voltage on input 72 drops sharply, as seen in FIG. 4, op-amp 64 switches to a low output which has no immediate effect on flip-flop 30 through NOR gate 80. However, op-amp 91 switches to a high output; and capacitor 96 supplies a pulse to NOR gate 100 to switch flip-flop 39 to a low output. As previously described, this causes the output voltage of op-amp 122 to ramp upward at a constant rate until it reaches a voltage equal to that applied to the positive input of op-amp 130.

When the voltage applied to the negative input of op-amp 130 exceeds that applied to the positive input, the output of op-amp 130 drops, which causes the output of op-amp 136 to switch from a low or ground state to a high state. Since voltage cannot change instantaneously across capacitor 139, this pushes the voltage at the positive input of op-amp 136 up instantaneously by a similar amount, capacitor 139 beginning to charge so that the voltage at the positive input of op-amp 136 begins to drop to its normal value. The sharp jump in output voltage of op-amp 136 is supplied to input 32 of NOR gate 81 to switch flip-flop 30 to its low state, turn off transistor 86 and turn on transistor 88. This causes Schmitt trigger circuit 23 to switch low and cut off current in spark coil primary 18a to cause a spark pulse which fires spark plug 24.

The sudden upward shift in voltage on the output of op-amp 136 is also supplied to input 40 of flip-flop 39, which causes its output voltage to switch high, transistor 107 to turn off and the output of op-amp 122 to begin ramping downward at a rate determined by the voltage on input 50 of variable discharge current source 43. Op-amp 130 thus switches high again almost immediately after having switched low; but, since the voltage supplied to the positive input of op-amp 136 has been pushed upward by capacitor 139, the output of op-amp 136 is prevented from switching low again until capacitor 139 is sufficiently charged. The values of capacitor 139 and its associated resistor 140 are chosen so that this time delay is equivalent to the minimum burn time required for the spark in spark plug 24, in this embodiment, 250 microseconds. As long as the output of op-amp 136 is high, flip-flop 30 cannot be shifted to its high output state by an upward shift in the output voltage of op-amp 64 caused by a new coil-on signal. Thus the current in spark coil primary 18a is held off, during every spark pulse, for a minimum of 250 microseconds; and this provides sufficient spark burn time, as previously described, for good combustion.

Since the circuit of FIG. 3 may be provided on a separate circuit chip from that including the conventional pickup and dwell circuitry 16 and Schmitt trigger 23, special circuitry can be provided for removing the diode drop of transistor 70 and diode 35 of the previously identified Richards et al reference to reference the switching to ground during engine starting, when the voltage output of coil 15 is very small in amplitude and the vehicle power voltage B, reduced by the heavy starting current drawn by the starter motor, can drop below the value required to maintain the regulated voltages V and V/2. This circuitry includes a transistor 150 having a grounded emitter, a collector connected to the collector of transistor 70 and a base connected through resistors 151 and 152 in series to ground. Another transistor 153 has its emitter grounded, its collector connected through a resistor 154 and capacitor 155 to input 72 and its base connected through a resistor 156 to the junction of resistors 151 and 152. A PNP transistor 158 has its collector connected to the junction of resistors 151 and 152, an emitter connected to potential source V and a base connected through a resistor 159 to potential source V and through a resistor 160 to an input 161 connected to means providing a ground potential when engine 10 is being started and a high potential at all other times. A zener diode 162 is provided across the emitter and collector of transistor 153. Capacitor 155 in FIG. 3 corresponds to capacitor 18 in the cited Richards et al reference; and the junction 163 between capacitor 155 and resistor 154 corresponds to the junction between capacitor 18 and resistor 44 in the Richards et al reference, so that inputs 72 and 163 are connected across coil 15 in FIG. 1.

In normal engine operation, the high voltage on input 161 maintains transistors 158, 153 and 150 in the off condition so that transistor 70 is maintained on as previously described and the pickup and dwell circuitry 16 and Schmitt trigger circuitry 23 are not otherwise effected. When a start or cranking signal is supplied to input 161, however, transistors 158, 153 and 150 are turned on. Transistor 150 conducting shorts out the collector of transistor 70 to ground to remove the base emitter diode drop of transistor 70. Transistor 153 conducting effectively removes a corresponding diode drop of the aforementioned Richards et al reference from the pickup and dwell circuitry 16. Zener diode 162 is similar in function to zener diode 89 in providing protection to the circuit of FIG. 3 from high voltage spikes introduced from the engine starting circuit. Of course, if circuits 16, 22 and 23 are all on the same chip or otherwise matched in temperature, the immediately preceding circuitry is not needed.

Figure 6:
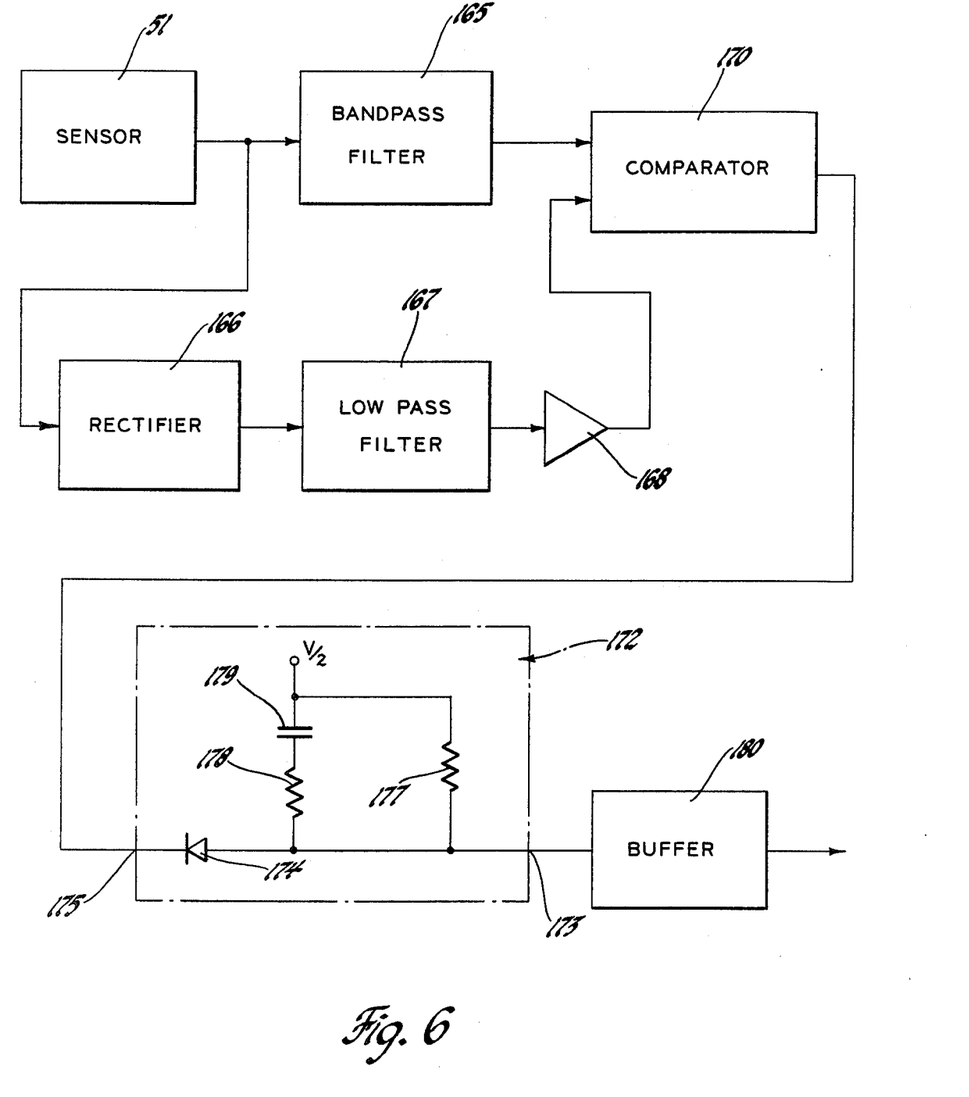
FIG. 6 shows a block diagram of another portion of the spark timing system of FIG. 1.

A system suitable for use as knock measuring circuitry 54, shown in FIG. 1, is presented in block diagram form in FIG. 6. Sensor 51, also shown in FIG. 1, is a vibration sensor which may be of the piezoelectric or magnetostrictive variety. The output of sensor 51 is applied to a bandpass filter 165 which has a center frequency of approximately 6.2 kilohertz and suppresses signals above and below that frequency. The output of sensor 51 is also applied through a rectifier 166, low pass filter 167 and amplifier 168, all in series, to generate a noise reference voltage. Rectifier 166 and low pass filter 167 derive a DC voltage from the signal of sensor 51; and amplifier 168 adjusts the level of the voltage to a value greater than the level of noise in the output of bandpass filter 165 but less than the peaks in the output of bandpass filter 165 due to knock-induced engine vibrations.

The output of bandpass filter 165 is compared with the DC reference output of amplifier 168 in a comparator 170; and the output of comparator 170 thus comprises pulses of constant height, one such pulse corresponding in both timing and duration to each portion of the output signal of bandpass filter 165 in excess of the DC reference voltage output of amplifier 168. The shape of the output signal of bandpass filter 165 is such that the higher the peaks of the signal are above the reference level, the wider will be their base at the reference level and thus the wider will be the output pulse from comparator 170.

The output of comparator 170 is provided to a conversion circuit 172, which converts the pulses from comparator 170 to a usable DC output voltage adapted for use in the spark timing system of this application. Circuit 172 has an output 173 connected back through a diode 174 to an input 175, which is connected to the output of comparator 170. Output 173 is also connected through a resistor 177 to power source V/2 and, in parallel, through a resistor 178 and capacitor 179 in series to power source V/2. Resistor 177 is much larger than resistor 178. Therefore, when input 175 is low, capacitor 179 will charge rapidly through resistor 178 and diode 174 so that the voltage on output 173 will rapidly decrease from V/2. On the other hand, when input 175 is high, diode 174 is backbiased; and capacitor 179 must discharge through resistors 178 and 177, the large size of resistor 177 creating a slow rise in the voltage on output 173.

The values of resistor 178 and capacitor 179 are selected so that, in response to engine knock, the output voltage on output 173 is pushed down quickly enough to respond to the knock but not so quickly as to cause engine surge unacceptable to an operator of the vehicle equipped with engine 10. Resistor 177 is selected so that the recovery rate of the voltage on output 173 is far slower. This improves general system stability and also ensures that, if the knock is occurring in only one cylinder, the system will not have recovered more than a fraction of the way toward the normal spark timing between consecutive firings of the knocking cylinder. Optimum values of these circuit components can be found by experimentation with any particular engine configuration; but typical values might provide a retard of several degrees of crankshaft rotation from one clearly audible knock event and a recovery time of 2 to 3 seconds from a full retard of 15° to 20°. A buffer 180 can be connected between output 173 and input 50 of variable discharge current source 43.

Sample values are listed below for the circuit elements of FIGS. 3 and 6.

diodes
58 1N4740
77 DS31
78 1N485B
89 1N5240
97 DS31
116 1N485B
118 1N485B
144 1N485B
162 1N5240
174 1N485B
capacitors
59 39MF
63 4.7MF
75 22PF
96 91PF
124 0.1F
133 56PF
134 0.01F
139 0.001F
143 0.01MF
155 2200PF
179 2.7MF
transistors
112 2N3906
158 2N3906
all other RCA CA 3081 module
  op amps
  64, 91, 130, 136 — National Semiconductor LM 2901 module
  110, 122 — National Semiconductor LM 2904 module
NOR gates
all - RCA CD 4001 module
resistors
57 150
60 10.0K
61 10.0K
65 30K
66 1M
68 30K
69 1.8K
73 10K
74 20K
82 15K
83 100
85 47K
87 47K
92 10K
93 1M
94 10K
98 510K
104 47K
105 47K
108 39.2K
111 75K
113 47K
114 47K
115 68K
117 110K
119 54.9K
123 20K
125 3.9M
131 20K 132 33K
135 33K
137 56K
138 20K
140 243K
142 100
151 15K
152 15K
154 100
156 15K
159 15K
160 30K
177 1M
178 510

It should be noted that in some embodiments of this invention a longer minimum burn time than the 250 microseconds of this embodiment — up to 700 microseconds and beyond — has been found advisable. Thus, the invention is not to be construed as applying only to a minimum burn time of 250 microseconds.

The embodiment described above is a preferred embodiment; but equivalents will occur to those skilled in the art. Therefore this invention should be limited only by the claims which follow.

The embodiments of the invention in which an exclusive property or privilege is claimed are defined as follows:

1. A spark timing system for an internal combustion engine having a crankshaft, a plurality of spark plugs, a spark coil adapted to provide spark pulses to the spark plugs in predetermined order as the crankshaft rotates, means for providing an electric current through the spark coil including switch means responsive to a coil-on signal to switch on the electric current and thus cause a buildup of electromagnetic energy in the spark coil and further responsive to a coil-off signal to switch off current in the coil and thus release the built up electromagnetic energy as a spark pulse, the system comprising, in combination:

signal generating means timed to crankshaft rotation, shiftable in phase with respect thereto in accordance with a program based on engine operating conditions and effective to generate a train of alternating coil-on and coil-off signals;

first means responsive to the signal generating means to normally pass the coil-on signals directly to the switch means to switch on current in the spark coil immediately with each coil-on signal;

second means responsive to the signal generating means to pass the coil-off signals to the switch means after a retard varying with at least one additional engine operating condition to turn off current in the coil and generate a spark pulse with each coil-off signal after said retard; and third means responsive to the second means to prevent the first means from passing the following coil-on signal to the switch means for a constant predetermined time, whereby the spark pulse is ensured a predetermined minimum burn time for good engine combustion, even at high engine speed when the next coil-on signal might occur before the retarded previous spark pulse.

2. A spark timing system for an internal combustion engine having a crankshaft, a plurality of spark plugs, a spark coil adapted to provide spark pulses to the spark plugs in predetermined order as the crankshaft rotates, means for providing an electric current through the spark coil including switch means responsive to a coil-on signal to switch on the electric current and thus cause a buildup of electromagnetic energy in the spark coil and further responsive to a coil-off signal to switch off current in the coil and thus release the built up electromagnetic energy as a spark pulse, the system comprising, in combination:

signal generating means timed to crankshaft rotation, shiftable in phase with respect thereto in accordance with a program based on engine operating conditions and effective to generate a train of alternating coil-on and coil-off signals;

bistable circuit means having output means connected to the spark coil and first input means connected to the signal generating means, the bistable circuit means being normally responsive to a coil-on signal on the first input means to assume a first stable state generating a coil-on signal on the output means to turn on current in the spark coil, the bistable circuit means further having second input means and being responsive to a coil-off signal on the second input means to assume a second stable state generating a coil-off signal on the output means to turn off current in the spark coil, the bistable circuit being responsive, when a coil-on signal is on the first input means and a coil-off signal is simultaneously on the second input means, to the coil-off signal;

retard means connected between the signal generating means and the second input of the bistable circuit means, the retard means being responsive to at least one additional engine operating condition and effective to retard the coil-off signal, and thereby the resulting spark pulse, in accordance with said condition;

one-shot multivibrator means connected between the retard means and the second input of the bistable means, the one-shot multivibrator means being responsive to the retarded coil-off signal from the retard means to generate a coil-off signal pulse having a predetermined time duration for application to the second input of the bistable circuit means, whereby the current in the spark coil is held off for at least said predetermined time duration and therefore a minimum burn time equal to said predetermined time duration is provided for the spark plugs for good engine combustion.

3. The method of providing spark pulses to the spark plugs of a spark-ignited internal combustion engine having a crankshaft and a spark coil, comprising the steps of:

generating alternating coil-on and coil-off signals in time with crankshaft rotation and shifted in phase with respect to the crankshaft according to a program based on one or more engine operating conditions to generate a normal spark timing;

normally initiating electric current conduction in the spark coil immediately with each coil-on signal to cause the buildup of electromagnetic energy in the spark coil;

cutting off electric current conduction in the spark coil with each coil-off signal to release the electromagnetic energy in a spark pulse to one of the spark plugs;

retarding the spark pulse from the corresponding coil-off signal by a crankshaft angle or rotation determined by a program based on at least one additional engine operating condition to retard the spark plug firing from the normal timing; and preventing the initiation of electric current conduction in the spark coil in response to each coil-on signal during a predetermined time after the initiation of the spark pulse resulting from the previous coil-off signal, whereby each spark pulse is ensured a minimum time duration and each spark plug a minimum burn time equal to said predetermined time for good engine combustion.

* * * * *